United States Patent

[11] 3,593,502

[72] Inventor Michael H. Pelosi, Jr.
Broomall, Pa.
[21] Appl. No. 553,841
[22] Filed May 31, 1966
[45] Patented July 20, 1971
[73] Assignee CRS Industries, Inc.

[54] MOUNTING FOR FLUID FILTERS
2 Claims, 5 Drawing Figs.

[52] U.S. Cl............................................. 55/481,
55/496, 55/502, 55/503, 210/232, 210/447,
285/236, 285/242
[51] Int. Cl.......................................... B01d 46/00
[50] Field of Search............................... 55/DIG. 8,
DIG. 31, DIG. 18, DIG. 29; 210/460, 232, 167,
446, 447; 285/235, 236, 238—242, 245, 248, 252,
259

[56] References Cited
UNITED STATES PATENTS
1,558,503 10/1925 Pressler..................... 285/236
1,832,776 11/1931 Hudson..................... 210/167 X
2,244,574 6/1941 Rogers...................... 210/131
2,642,061 6/1953 Boyer....................... 55/503 X
2,697,522 12/1954 Lawrence.................. 210/487 X
2,824,575 2/1958 Rosen....................... 285/242 X
3,310,322 3/1967 Carroll..................... 285/18
FOREIGN PATENTS
1,031,266 3/1953 France..................... 55/481

Primary Examiner—Dennis E. Talbert, Jr.
Attorney—Paul & Paul

ABSTRACT: A mounting for fluid filters of the type which have a filter carried in a rigid frame, the frame having nonrigid or flexible entrance and exit ducts extending thereto and in overlapped relation to prevent leakage, with seals also to confine the fluid to be filtered, the outer ends of the ducts being detachably connected into a duct system and when detached being movable toward and away from the filter for purposes of installation and changeover.

PATENTED JUL 20 1971

3,593,502

INVENTOR
MICHAEL H. PELOSI, JR.

BY
B. T. Wolvensmith

ATTORNEY

MOUNTING FOR FLUID FILTERS

This invention relates to the mounting of filters and more particularly to mounting of high efficiency fluid filters.

Heretofore the mounting of high efficiency filters which may have an efficiency as high as 99.97 percent has been beset with difficulty. These filters cause a large pressure drop in the fluid passing through them which for air may amount to 1 inch of water or more. Such drop due to the high efficiency and consequent high resistance to air passage is inherent. Filters of this type are generally installed in metal frames inside metal ducts and sealed at their edges by sealants such as elastic caulking compounds and polyurethane foam. Due to the high resistance the seal must be absolutely airtight, and must be maintained for the life of the filter. Some sealants used have a tendency to dry out and crack in time thereby allowing contaminated air to bypass the filter and consequently reduce the filtering efficiency of the system. While the initial filter installers are usually well trained and careful, replacement is usually made by relatively untrained personnel who do not use the proper installation equipment or exercise the necessary care required to provide an airtight seal on both the frame and the filter.

In addition the filters in use are open at both sides and on the job are often removed from their packing and left exposed to dirt and other contaminants for some time before installation.

The principal object of the present invention is to provide a mounting for a high efficiency filter that is presealed without a metal frame and is easy to install and replace by untrained personnel.

A further object of the present invention is to provide a mounting for high efficiency filters that is economical to manufacture and to install.

A further object of the present invention is to provide a mounting for high efficiency filters that reduces the preinstallation contamination of the filter.

A further object of the present invention is to provide a mounting for high efficiency filters that maintains the sealed characteristics of the filter and its mounting during its useful life.

A further object of the present invention is to provide a mounting for high efficiency filters which is not subject to transmitted vibrations from attached duct work.

A further object of the present invention is to provide a mounting for high efficiency filters using materials that are not subject to erosion abrasion or corrosion by the contaminants carried in the air to be filtered.

A further object of the present invention is to provide a mounting for high efficiency filters that permits rapid and simple replacement with a filter of different efficiency.

Other objects and advantageous features of the invention will be apparent from the description and claims.

The nature and characteristic features of the invention will be more readily understood from the following description taken in connection with the accompanying drawings forming part thereof, in which.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a preferred embodiment of the invention is there illustrated.

Figure 1:
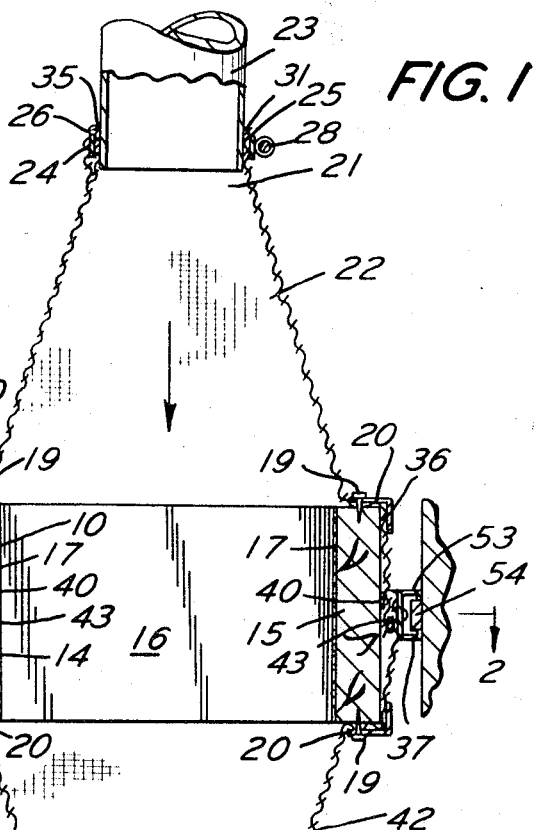
FIG. 1 is a longitudinal sectional view of a mounting for filters in accordance with the present invention.

The mounting as shown, may be installed with air flowing either horizontally or vertically through the filter. A filter 16, which may be any suitable filter with opposite inlet and outlet faces and which is illustrated as a high efficiency particulate air of HEPA filter is provided within a frame 10 of rectangular shape with horizontal top and bottom rail members 11 and 12 connected by vertical side rail members 14 and 15. The rail members 11 and 12 and 14 and 15 are preferably of wood or other suitable light relatively inert material, and are joined at the respective corners to provide a rigid boxlike structure. Mastic seals 17 are provided located around the edges or peripheral face portion of the filter 16 on the insides of the top, bottom, and side rail members 11, 12, 14 and 15 of the frame 10 bonding the filter 16 to the rail members 11, 12, 14 and 15, thereby providing an airtight seal. Any suitable material for sealing the filter edges can be used as desired, depending of course on the contaminant materials to be filtered out of the filter and the reaction characteristics of the sealant employed. As can be seen in FIG. 1, the upper end of the filter 16 defines an inlet face while the lower end of the filter 16 defines an outlet face.

Figure 4:
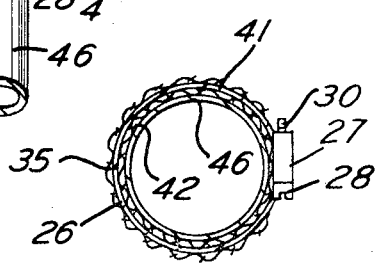
FIG. 4 is a section taken approximately on the line 4-4 of FIG. 1.

An entrance transition duct 22 is provided for connection to and extending from an air supply duct 23, and which duct 22 is of approximately conical shape in cross section. The duct 22 is preferably formed of a laminated flexible inert material, vinyl coated nylon fabric being particularly suitable but other synthetic plastic sheet materials which do not erode, corrode, or abrade may be used as desired. The duct 22 has an outer end or entrance portion 21 which is circular as illustrated in FIG. 4, and retained on the duct 23 by an encircling band clamp 25 of well-known type. The clamp 25 has an outer band 26, nut 27 and screw member 28. The band 26 can be provided with slots (not shown) wherein threads 30 of screw 28 engage to tighten the band 26 as desired. The duct 22 at the entrance 21 has a terminal band of cloth 24 folded back over the clamp 25 and secured to the duct 22. An opening 31 is provided in the band 24 for access to the screw 28 for tightening or releasing of the band 26 of clamp 25. A coating 35 of suitable adhesive can be applied to the inside of entrance portion 21 in order to obtain a better seal between duct 22 and duct 23, if desired.

The duct 22 extends forwardly from delivery duct 23 to an inner end duct which is fastened and sealed at its inner end to the outside faces 36 of the rails 11, 12, 14 and 15, in overlapped relation thereto, by rigid metallic fixed supporting members 37 illustrated as channels and fasteners 38 such as nails or screws extending through the members 37. The members 37 are four in number and extend around the outside of frame 10 and also serve to provide a trackway and support for frame 10. The duct 22 has a double-faced adhesive gasket 40 between duct 22 and faces 36 of frame 10 to provide a seal between the duct 22 and frame 10.

An exit duct 42 is also provided attached at its inner end to the frame 10 between the members 37 and frame 10 in overlapping relation to the duct 22 and members 37, with a double-faced adhesive gasket 43 between duct 42 and duct 22 providing a seal at that location. The exit duct 42 is similar in shape to duct 22 and extends forwardly from its inner end attached in overlapping relation to the peripheral faces 36 to an outer end or exit portion 45 which is clamped by encircling clamp 25 to a discharge duct 46. The exit portion 45 has a terminal band of cloth 41 folded back over clamp 25 and secured to duct 42.

The exit portion 45 of duct 42 can have an adhesive coating 35 thereon between it and duct 46 to provide a better seal if desired.

In order to secure the duct 22 and the duct 42 to the frame 10, and to provide smooth flow without ballooning of these ducts it is preferred that angles 20 be disposed therealong, these being secured to the frame 10 by fasteners 19.

Figure 3:
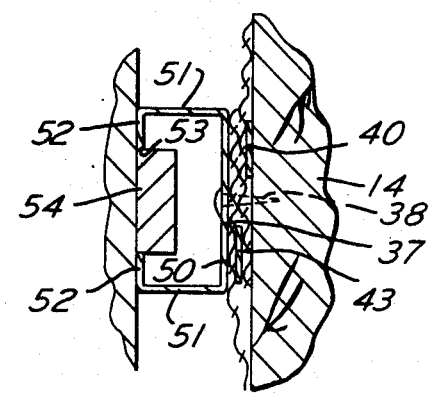
FIG. 3 is a fragmentary sectional view on a larger scale showing a portion of the filter mount in place.
Figure 3A:
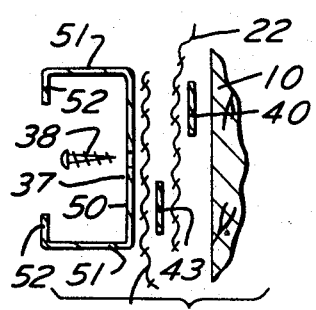
FIG. 3A is an exploded view of the structure shown in FIG. 3.
Figure 2:
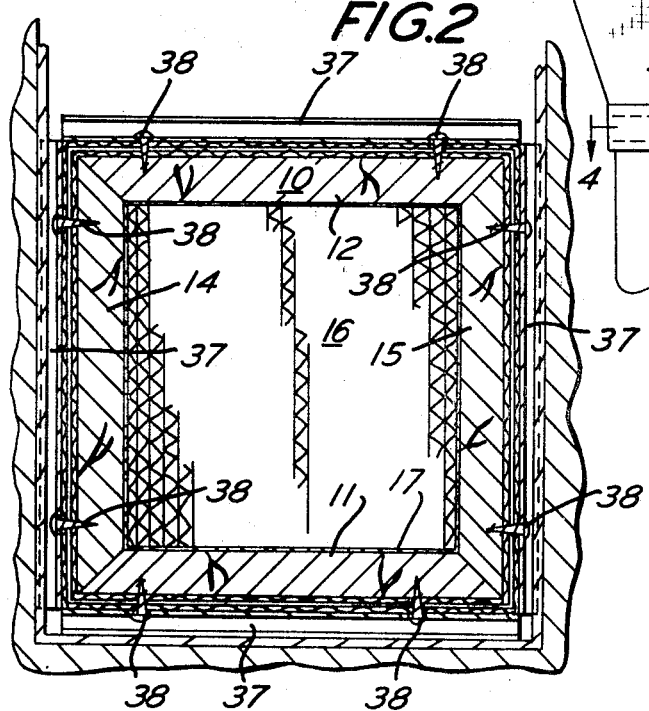
FIG. 2 is a section taken approximately on the line 2-2 of FIG. 1.

As illustrated more particularly in FIG. 3, the members 37 can be of C shape with flat duct-engaging portions 50, perpendicular sidewalls 51 and inwardly extending spacing walls 52 forming a trackway 53 therebetween. Flat rigid members 54 are provided fastened to the walls or cabinet between which the frame 10 is to be mounted with the member 37 in gripping relation to them and retaining the frame 10 in place.

The method of installation will now be pointed out. The filter 16 in its frame 10, ducts 22 and 42 and other parts are removed from their packing. The ducts 22 and 42 are folded back over the filter 16 to protect it from contamination before installation if it is not effected soon after removal from its packing. To install the filter mounting, the frame 10 is lifted and members 37 slid down between the flat trackway members 54 which retain and guide them into place. The duct 22 is unfolded and adhesive coating 35 applied around the inner part of entrance portion 21 if desired. The portion 21 is placed over delivery duct 23 and band 26 of clamp 25 tightened by screw 28.

The exit portion 45 of duct 42 is unfolded and an adhesive coating 35 applied to the inside thereof if desired. The exit portion 45 is then placed over discharge duct 46 and clamp 25 tightened by band 26 and screw 28.

Removal and installation of a new filter mounting can be effected by a repeat of these steps.

I claim:

1. A filter and a mounting means therefor comprising:
   a filter for removing particles from gaseous fluid and having inlet and outlet faces,
   a rigid surrounding frame for said filter having a peripheral face portion,
   a nonrigid entrance duct member having an outer end and an inner end extending to said frame and being in overlapped relation to said peripheral face portion,
   a nonrigid exit duct member having an outer end and an inner end extending to said frame and being in overlapped relation to said peripheral face portion,
   said duct members being of flexible material and the outer end of each duct member being movable toward and away from its inner end,
   said inner ends of said duct members having a cross section at least as large as the inlet and outlet faces of the filter,
   sealing means interposed between said inner ends of said ducts and said peripheral face portion,
   fixed supporting members for supporting said frame in operating position independently of the outer ends of said duct members, and
   members for detachably connecting the outer ends of said duct members into a duct system whereby said duct members have their outer ends collapsibly movable with respect to said frame for installation in and removal from said duct system,
   one of said duct members having its inner end in overlapped relation to the inner end of the other duct member on said peripheral face portion.

2. A filter and a mounting means therefor comprising:
   a filter for removing particles from gaseous fluid and having inlet and outlet faces,
   a rigid surrounding frame for said filter having a peripheral face portion,
   a nonrigid entrance duct member having an outer end and an inner end extending to said frame and being in overlapped relation to said peripheral face portion,
   a nonrigid exit duct member having an outer end and an inner end extending to said frame and being in overlapped relation to said peripheral face portion,
   said duct members being of flexible material and the outer end of each duct member being movable toward and away from its inner end,
   said inner ends of said duct members having a cross section at least as large as the inlet and outlet faces of the filter,
   sealing means interposed between said inner ends of said ducts and said peripheral face portion,
   fixed supporting members for supporting said frame in operating position independently of the outer ends of said duct members,
   detachable connecting members for detachably connecting the outer ends of said duct members into a duct system whereby said duct members have their outer ends collapsibly movable with respect to said frame for installation in and removal from said duct system,
   said fixed supporting members being in surrounding relation to said frame comprising channels with their web portions in flat relation to said peripheral face portion, and
   rails with which at least two of said channels are in slidable engagement.

PO-1050
(5/69)

UNITED STATES PATENT OFFICE
CERTIFICATE OF CORRECTION

Patent No. 3,593,502            Dated July 20, 1971

Inventor(s) Michael H. Pelosi, Jr.

It is certified that error appears in the above-identified patent and that said Letters Patent are hereby corrected as shown below:

Column 2, line 7, after "air", --of-- should be --or--.

Column 2, line 47, before "duct", insert --of--.

Column 2, line 47, after "duct", insert -- 22--.

Column 2, line 48, after "outside", insert --peripheral--.

Signed and sealed this 4th day of January 1972.

(SEAL)
Attest:

EDWARD M. FLETCHER, JR.           ROBERT GOTTSCHALK
Attesting Officer                Acting Commissioner of Patents